Patented Sept. 28, 1937

2,094,467

UNITED STATES PATENT OFFICE 2,094,467

PRODUCTION OF NEW THIO ETHERS

Walter Reppe and Fritz Nicolai, Ludwigshafen-on-the-Rhine, Germany, assignors to I. G. Farbenindustrie Aktiengesellschaft, Frankfort-on-the-Main, Germany No Drawing. Application August 1, 1935, Serial No. 34,296. In Germany August 4, 1934

10 Claims. (Cl. 260—46)

The present invention relates to new thio ethers and a process of producing same.

We have found that hydrogen sulphide and the monovalent and polyvalent mercaptans are capable of adding on to N-vinyl pyrrole compounds, i. e. N-vinyl pyrrole or compounds containing the pyrrole ring which are readily accessible by reacting acetylene at elevated temperatures with pyrrole compounds in the presence of a strongly alkaline reacting substance.

The adding on of the hydrogen sulphide and the mercaptans to the N-vinyl compounds takes place according to the following equations:—

1. $2XN-CH=CH_2 + HSH =$
$XN-CH_2-CH_2-S-CH_2-CH_2-NX$
2. $yXN-CH=CH_2 + (HS)_yR =$
$(XN-CH_2-CH_2-S)_yR$ in which XN is the radicle of pyrrole or a compound containing the pyrrole ring, such as indole, carbazole, propylcarbazole, tetrahydrocarbazole, naphthocarbazole or substitution products thereof, and R is an aliphatic, isocyclic or heterocyclic radicle, and $y$ is one or a multiple of one.

Aliphatic, isocyclic and heterocyclic mercaptans may be employed and they may be substituted by halogen, nitro, alkoxy, amino and other groups. As examples may be mentioned methyl mercaptan, ethyl mercaptan, butyl mercaptan, dodecyl mercaptan, ethylene mercaptan, benzyl mercaptan, thiophenol, thiocresol, chlorthioxylenol, thionaphthol, 1- or 2-mercaptoanthraquinone, thioresorcinol and mercaptobenzothiazole.

In this manner a large number of a new kind of chemical compounds can be obtained which are of importance as dyestuff intermediates, as vulcanization accelerators and for pharmaceutical purposes.

The reaction is exothermic. The heat evolved is frequently so great that the reaction mixture becomes heated to the boiling temperature.

The preparation of the condensation products on an industrial scale is very simple. The reaction temperature, generally speaking, lies between room temperature and about 300° C.

The addition of hydrogen sulphide to the said vinyl compounds may be carried out either by leading the hydrogen sulphide at ordinary or slightly elevated temperature through the vinyl compound which is liquid, fused or dissolved or suspended in a suitable solvent, as for example ethanol, butanol, benzene, chlorbenzene, or toluene, or by causing the hydrogen sulphide to act on the vinyl compound in a pressure-tight container under increased pressure.

For the purpose of adding on the mercaptans to the vinyl compounds, the components may be mixed in suitable proportions and then heated gently until reaction commences; one of the two components may be employed in excess, however, and the second component introduced into the mass at the rate at which the reaction proceeds.

When the condensation is carried out in one of the said solvents, if desired only one component may be dissolved in the solvent, the second component being led into the solution in the vapor phase.

In order to prevent a partial polymerization of the vinyl compounds during the condensation, it is sometimes preferable to add to the vinyl compounds a small amount of a polymerization retarder. As such may be mentioned especially alkaline acting substances, such as alkalies, alkali metal alcoholates, ammonia and organic bases, which substances frequently also promote the condensation.

The recovery of the condensation products in a pure state can be effected by crystallization, distillation or precipitation.

The yield is usually quantitative.

The following examples will further illustrate how the present invention may be carried out in practice, but the invention is not restricted to these examples. The parts are by weight.

Example 1

0.5 part of caustic potash is added to a solution of 19.5 parts of vinyl carbazole in 150 parts of ethanol, and hydrogen sulphide is then led in at 75° C. until no further absorption takes place.

After cooling the reaction solution, the deposited colorless crystalline mass is separated and, if necessary, crystallized from toluene. It consists of di-(carbazyl-N-ethylene)-sulphide having a melting point of 204° C. and the formula:

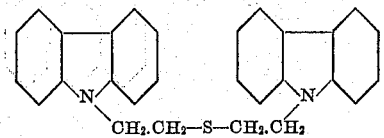

The same product is obtained by carrying out the reaction in a pressure-tight vessel and causing the hydrogen sulphide to act on the alcoholic vinyl carbazole solution under a pressure of from 10 to 20 atmospheres. The reaction is then completed in a considerably shorter time.

Example 2

A mixture of equal parts of vinyl indole and butanol, in which 0.1 per cent by weight of metallic potassium has been dissolved is saturated with hydrogen sulphide at about 80° C. By distilling the reaction product di-(indolyl-N-ethylene)-sulphide having the formula:—

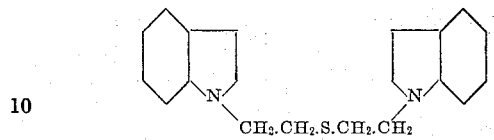

is obtained as a viscous oil having a boiling point of from 200° to 210° C. at from 1 to 2 millimetres (mercury gauge).

Example 3

A solution of 39 parts of vinyl carbazole and 25 parts of thiocresol in 300 parts of ethanol is heated for 12 hours to boiling and then allowed to cool. The separated crystals are filtered off by suction. In this manner a yield of 80 per cent of the theoretical yield of carbazyl-N-ethylene-paratolyl sulphide having the formula:—

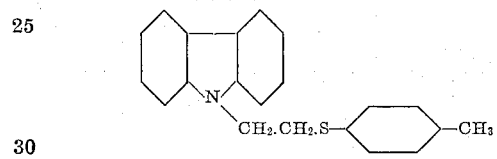

and having a melting point of 75° C. is obtained.

In the same manner vinyl carbazole and 1.4-dimethyl-2-chlor-5-mercaptobenzene yield the sulphide melting at 104° C. and having the formula:—

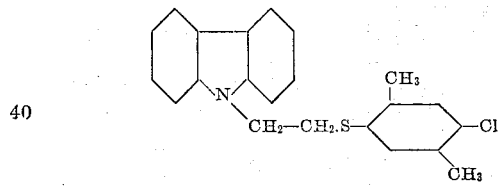

Example 4

1 part of sodium ethylate is added to a solution of 12 parts of 2-mercaptoanthraquinone in 400 parts of toluene at a temperature of 50° C. in a stirring vessel provided with a reflux condenser. A solution of 10 parts of vinyl carbazole in 50 parts of toluene is then allowed to flow in in the course of an hour. The reaction mixture is heated for 12 hours at the boiling temperature. After removing the toluene by distillation, the sulphide having the formula:—

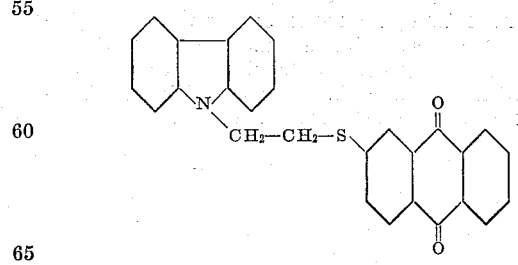

is obtained as a golden yellow powder having a melting point of 167° C. It dissolves in concentrated sulphuric acid giving a cherry-red coloration and gives a cherry-red vat.

Example 5

A mixture of 193 parts of vinyl carbazole, 50 parts of ethylene mercaptan and 200 parts of chlorbenzene is boiled for 4 hours under reflux cooling while stirring. After cooling the colorless crystals formed by the reaction are separated by suction and washed with ether. Thus, ethane-dithio-N-ethylene carbazole of the formula:—

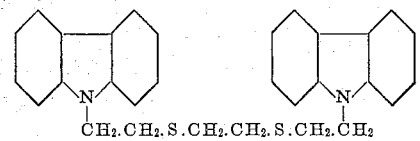

and having the melting point of 175° C. is obtained.

What we claim is:—

1. The process of producing thio ethers which comprises treating an N-vinyl pyrrole compound with a sulphur compound selected from the group consisting of hydrogen sulphide and mercaptans.

2. The process of producing thio ethers which comprises treating an N-vinyl pyrrole compound with a monovalent mercaptan.

3. The process of producing thio ethers which comprises treating an N-vinyl pyrrole compound with a divalent mercaptan.

4. The process of producing thio ethers which comprises treating an N-vinyl pyrrole compound with a sulphur compound selected from the group consisting of hydrogen sulphide and mercaptans in the presence of an inert organic diluent.

5. The process of producing thio ethers which comprises treating an N-vinyl pyrrole compound with a sulphur compound selected from the group consisting of hydrogen sulphide and mercaptans at a temperature up to 300° C.

6. The process of producing thio ethers which comprises treating an N-vinyl pyrrole compound with a sulphur compound selected from the group consisting of hydrogen sulphide and mercaptans in the presence of a catalyst substance having a basic action selected from the group consisting of caustic alkalies and alkali metals.

7. Thio ethers obtained by treating an N-vinyl pyrrole compound with a sulphur compound selected from the group consisting of hydrogen sulphide and mercaptans.

8. β.β'(di(carbazyl-N-ethylene)) sulphide.

9. β-(carbazyl-N-ethylene)-para-tolyl sulphide.

10. β-(carbazyl-N-ethylene)-1.4-dimethyl-2-chlor-5-benzenesulphide.

WALTER REPPE.
FRITZ NICOLAI.